(12) United States Patent
Horiuchi et al.

(10) Patent No.: US 6,556,325 B1
(45) Date of Patent: Apr. 29, 2003

(54) OPTICAL REPEATER MONITORING SYSTEM AND A METHOD THEREOF

(75) Inventors: Yukio Horiuchi, Kamifukuoka (JP); Masatoshi Suzuki, Kamifukuoka (JP); Shu Yamamoto, Kamifukuoka (JP); Shigeyuki Akiba, Kamifukuoka (JP)

(73) Assignees: KDD Corporation, Tokyo (JP); KDD Submarine Cable Systems, Inc., Tokyo (JP)

( * ) Notice: Subject to any disclaimer, the term of this patent is extended or adjusted under 35 U.S.C. 154(b) by 0 days.

(21) Appl. No.: 09/507,233

(22) Filed: Feb. 18, 2000

(51) Int. Cl.$^7$ ............................................. H04B 10/02
(52) U.S. Cl. ...................... 359/177; 359/175; 359/176
(58) Field of Search ................................ 359/174, 175, 359/176, 177

(56) References Cited

U.S. PATENT DOCUMENTS

| | | | | |
|---|---|---|---|---|
| 5,657,154 A | * | 8/1997 | Yoneyama | 359/337 |
| 5,969,833 A | * | 10/1999 | Jensen | 359/110 |
| 6,025,948 A | * | 2/2000 | Gautheron | 359/177 |

FOREIGN PATENT DOCUMENTS

| | | |
|---|---|---|
| EP | 0 898 387 | 2/1999 |
| GB | 2 294 373 | 4/1996 |

* cited by examiner

Primary Examiner—Kinfe-Michael Negash
(74) Attorney, Agent, or Firm—Christie, Parker & Hale, LLP (57) ABSTRACT

An optical repeater monitoring system, according to the invention, comprises an oscillating source, a reference signal transmitter for transmitting a reference signal of a predetermined frequency generated from an output of the oscillating source to a first optical fiber, and an optical repeater. The optical repeater has a first photodetector for converting light from the first optical fiber into an electrical signal, a reference signal extractor for extracting a component of the reference signal from an output of the first photodetector, a carrier generator for generating a carrier from an output of the reference signal extractor, a monitor signal modulator for modulating the carrier generated by the carrier generator with a monitor signal showing a operating state of the optical repeater, a transmitter for transmitting an output of the monitor signal modulator to a second optical fiber. The system further comprises a demodulating signal generator for generating a demodulating signal from either of the output from the oscillating source and the reference signal, the demodulating signal having a frequency equal to that of the monitor signal carrier, a second photodetector for photodetecting the light propagated on the second fiber, and a monitor signal demodulator for demodulating the monitor signal from outputs of the second photodetector and demodulating signal generator.

34 Claims, 5 Drawing Sheets

FIG. 1

FIG. 2A Signal transmission from terminal station 10 to optical repeater 18

FIG. 2B Signal transmission from optical repeater 18 to terminal station 10

OPTICAL REPEATER MONITORING SYSTEM AND A METHOD THEREOF

FIELD OF THE INVENTION

This invention relates to an optical repeater monitoring system and a method thereof, and more specifically, to a system and a method thereof for transmitting monitored information of a repeater and the like to a terminal station in an optical transmission system.

BACKGROUND OF THE INVENTION

In an optical transmission system, especially in an optical repeatered transmission system comprising at least one optical repeater for optically amplifying and repeating optical signals, it is necessary to remotely monitor and control an operating state and the like of the optical repeater. In a conventional system, for the purpose of transmitting an operating state of an optical repeater to a terminal station, a local oscillating signal source having a individual or common frequency is disposed in each optical repeater and an output of the signal source is modulated with a repeater monitoring information data and transmitted to the terminal station.

The oscillation frequency of the local oscillation signal source, however, fluctuates due to a temperature variation as well as aging and therefore the terminal stations are required to prepare a wider receiving bandwidth in anticipation of the frequency fluctuation. Therefore, in the conventional systems, signal-to-noise ratio (SNR) is deteriorated owing to the inefficiently wider bandwidth.

SUMMARY OF THE INVENTION

An object of the present invention is to solve the aforementioned problems and provide an optical repeater monitoring system and a method thereof for receiving a monitor signal at a high SNR.

An optical repeater monitoring system, according to the invention, comprises an oscillating source, a reference signal transmitter for transmitting a reference signal of a predetermined frequency generated from an output of the oscillating source to a first optical fiber, and an optical repeater. The optical repeater has a first photodetector for converting light from the first optical fiber into an electrical signal, a reference signal extractor for extracting a component of the reference signal from an output of the first photodetector, a carrier generator for generating a carrier from an output of the reference signal extractor, a monitor signal modulator for modulating the carrier generated by the carrier generator with a monitor signal showing a operating state of the optical repeater, a transmitter for transmitting an output of the monitor signal modulator to a second optical fiber. The system further comprises a demodulating signal generator for generating a demodulating signal from either of the output from the oscillating source and the reference signal, the demodulating signal having a frequency equal to that of the monitor signal carrier, a second photodetector for photodetecting the light propagated on the second fiber, and a monitor signal demodulator for demodulating the monitor signal from outputs of the second photodetector and demodulating signal generator.

With the above-mentioned configuration, it is no longer necessary to dispose local oscillator in an optical repeater since a carrier, which transmits a monitor signal showing an operating state of the optical repeater to a terminal station, can be generated in the optical repeater out of a reference signal from the same or another terminal station. As a result, a receiving side of the monitor signal has no need to consider a frequency fluctuation of a carrier for carrying the monitor signal and therefore it is also not necessary to dispose a receiver having an inefficiently wide bandwidth for receiving the monitor signal. Since synchronous detection can be used for demodulating the monitor-signal-modulated signal, the monitor signal can be demodulated at a high SNR. The monitor signal can be received at either of terminal stations; the one transmits the reference signal or another one.

When the reference signal is superimposed on a transmission signal light, an optical fiber transmission line can be effectively utilized. Also, when a dedicated light is used for carrying the monitor signal, a bad influence on the signal light can be reduced.

The optical repeater monitoring method, according to the invention, comprises a reference signal transmitting step for transmitting a reference signal having a predetermined frequency from a reference signal transmitter toward an optical repeater through an optical fiber line, a carrier generating step in the optical repeater for generating a carrier from the reference signal; the carrier has a frequency different from that of the reference signal and carries a monitor signal of the optical repeater, a monitor signal modulating step in the optical repeater for modulating the carrier with the monitor signal, a monitor signal transmitting step in the optical repeater for transmitting the modulated wave of the monitor signal by the monitor signal modulating step to a monitor signal receiver, a demodulating signal generating step in the monitor signal receiver for generating a demodulating signal having a frequency equal to that of the carrier, and a monitor signal demodulating step in the monitor signal receiver for demodulating the monitor-signal-modulated signal from the optical repeater is demodulated with the demodulating signal.

The above-mentioned configuration produces advantages similarly to the optical repeater monitoring system according to the invention.

DESCRIPTION OF THE PREFERRED EMBODIMENT

Embodiments of the present invention are explained below in detail with reference to the drawings.

Figure 1:
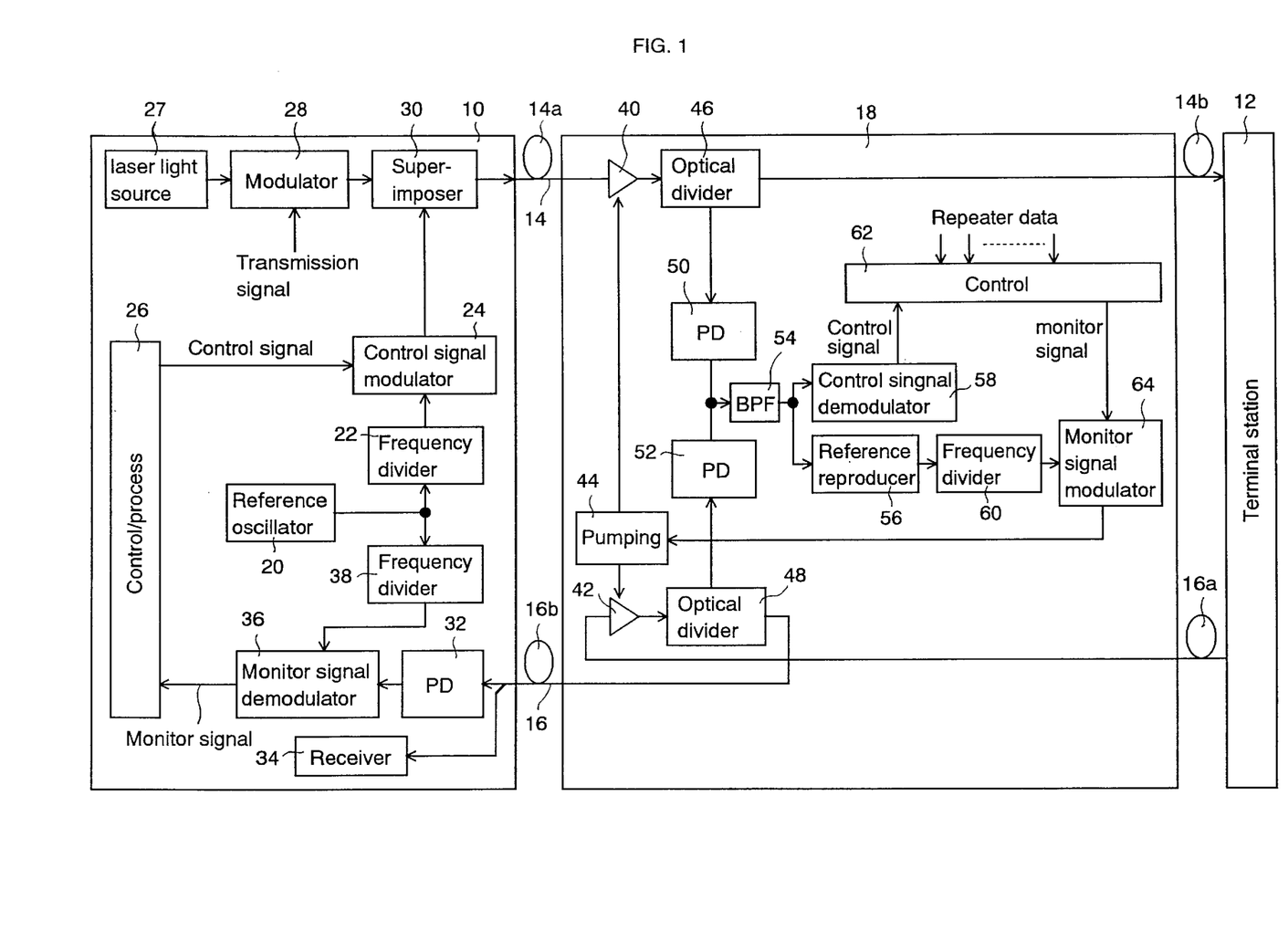
FIG. 1 is a schematic block diagram according to an embodiment of the present invention.

FIG. 1 is a schematic block diagram according to an embodiment of the invention. An optical fiber line 14 for transmitting signal light from a terminal station 10 to a terminal station 12 and an optical fiber line 16 for transmitting the signal light from the terminal station 12 to the terminal station 10 are disposed between the terminal stations 10 and 12. An optical repeater 18 is disposed halfway on the optical fiber lines 14 and 16. For explanatory convenience, on the optical fiber line 14, an optical fiber between the terminal station 10 and the optical repeater 18 is expressed as a reference numeral 14*a* and an optical fiber between the optical repeater 18 and the terminal station 12 is expressed as a reference numeral 14*b*. Similarly, on the optical fiber line 16, an optical fiber between the terminal station 12 and the optical repeater 18 is expressed as a reference numeral 16*a* and an optical fiber between the optical repeater 18 and the terminal station 10 are expressed as a reference numeral 16*b*.

The configuration and operation of the terminal station 10 is explained below. A reference oscillator 20 oscillates a frequency signal (e.g. 6.37 MHz) for use in generating a carrier to be used when the optical repeater 18 transmits a monitor signal including a repeater data to the terminal station 10 (or the terminal station 12). The output of the reference oscillator 20 is divided (e.g. into 1/14) by a frequency divider 22 and applied to a control signal modulator 24. A control/process circuit 26 generates a control signal for controlling the optical repeater 18 and applies it to the control signal modulator 24. In this embodiment, the terminal station 10 transmits the control signal and reference signal to the optical repeater 18 using the time division. The control signal modulator 24 modulates a frequency signal (a frequency signal to be transmitted to the optical repeater 18) from the frequency divider 22 with the control signal from the control/process circuit 26 during the period in which the control signal should be transmitted to the optical repeater 18, and outputs the output of the frequency divider 22 without processing during the other period; namely the period in which the reference signal should be transmitted to the optical repeater 18. Preferably, the reference signal should be a tone signal having a single frequency.

A laser light source 27 generates a laser light for carrying a signal (e.g. 10 Gbit/s) to be transmitted to the terminal station 12. An optical modulator 28 modulates the intensity of the output laser light from the laser light source 27 with a transmission signal and outputs an RZ optical pulse train or NRZ optical pulse train. A superimposer 30 superimposes the output of the control signal modulator 24 on the signal light from the optical modulator 28. As to the methods for superimposing, although details are described later, there are concretely two methods; one is to use a dedicated wavelength light for carrying the control signal (and the reference signal) and the other is to modulate the amplitude of the signal light from the optical modulator 28 with the output of the control signal modulator 24. The output light of the superimposer 30 inputs and propagates the optical fiber 14*a* of the optical fiber line 14 and then enters the optical repeater 18.

On the other hand, a photodetector 32 converts the input light from the optical fiber line 16 into an electrical signal. The signal light entered the photodetector 32, as to be described later, also carries a monitor signal including a repeater data of the optical repeater 18. A receiver 34 converts the input light from the optical fiber line 16 into an electrical signal as well as receives and processes the signal from the terminal station 12. The output from the photodetector 32 enters a monitor signal demodulator 36. A frequency divider 38 divides the output of the reference oscillator 20 at a dividing ratio (e.g. 7/148) so as to obtain a frequency (e.g. 43.041 kHz) of a carrier to be used when the optical repeater 18 transmits the monitor signal to the terminal station 10, and applies the divided signal to a monitor signal demodulator 36. The monitor signal demodulator 36 demodulates the monitor signal from the output of the photodetector 32 using the output of the frequency divider 38. The demodulated monitor signal is supplied to a control/process circuit 26.

The configuration and operation of the optical repeater 18 is explained. Optical amplifiers (e.g. optical amplifiers using erbium-doped optical fiber) 40 and 42 are pumped by a pumping light from a pumping circuit 44 and then optically amplify signal lights from optical fibers 14*a* and 16*a* respectively. Optical dividers 46 and 48 output most of the outputs from the optical amplifiers 40 and 42 toward the following optical fibers 14*b* and 16*b* respectively and supply a portion of the outputs to photodetectors 50 and 52 respectively. The photodetectors 50 and 52 convert the light from the optical dividers 46 and 48 into electrical signals respectively. The photodetectors 50 and 52 can be low-speed as far as they can detect the control signal and reference signal from the terminal station 10.

The outputs from the photodetectors 50 and 52 are compounded using wire-OR and applied to a bandpass filter (BPF) 54. Instead of using the two photodetectors 50 and 52, it is also applicable that the output lights from the optical dividers 46 and 48 are put together first and then converted into electrical signals by a photodetector. With this configuration, the optical repeater 18 can be monitored from both terminal stations 10 and 12 in the single repeater monitoring circuit. That is, this configuration allows monitoring the optical repeater 18 from both terminal stations 10 and 12 as well as lowering the cost of equipment.

The BPF 54 extracts the frequency components of the control and reference signals from the terminal station 10 out of the outputs of the photodetectors 50, 52 and supplies them to a reference reproducing circuit 56 and a control signal demodulator 58. The reference reproducing circuit 56 multiplies the reference signal components contained in the outputs of the BPF 54 using a phase locked loop (PLL), and then a frequency divider 60 produces a carrier for carrying a monitor signal by dividing the outputs of the reference reproducing circuit 56. That is, the reference reproducing circuit 56 and frequency divider 60 compose a carrier generating circuit. Owing to the aforementioned frequency multiplying and dividing, a carrier with a stable frequency can be obtained. Needless to say, the reference reproducing circuit 56 can be a narrow band pass filter for extracting the frequency component of the reference signal from the terminal station 10. In this embodiment, for instance, the reference reproducing circuit 56 multiplies the reference frequency (455 kHz) components of the output from the BPF 54 by seven, and the frequency divider 60 divides the output frequency of the reference reproducing circuit 56 by 74. The output frequency of the frequency divider 60 becomes 43.04 kHz.

The control signal demodulator 58 demodulates the control signal from the output of the BPF 54 and supplies it to a control circuit 62. The control circuit 62 controls or monitors each part according to the control signal from the control signal demodulator 58 and outputs a monitor signal showing a monitored result toward a monitor signal modulator 64. Applied to the monitor signal modulator 64 is the output of the frequency divider 60. The monitor signal modulator 64 modulates the output of the frequency divider 60 with the monitor signal from the control circuit 62. As the modulation method, for instance, amplitude-shift keying (ASK), frequency-shift keying (FSK) or phase-shift keying (PSK) is preferable.

The output of the monitor signal modulator 64 is applied to a pumping circuit 44. The pumping circuit 44 weakly modulates the intensity of the pumping light to be transmitted to the optical amplifier 40 and/or the optical amplifier 42 according to the output from the monitor signal modulator 64. Consequently, a monitor-signal-modulated signal is superimposed on signal light propagating from the terminal station 12 to the terminal station 10 on the optical fiber line 16 and transmitted to the terminal station 10. In the embodiment, the gain of the optical amplifier 42 is modulated by the output of the monitor signal modulator 64 in order to transmit the monitor signal to the terminal station 10. However, it is also applicable to cause Raman amplification on the optical fiber line 16 and change its gain according to the output of the monitor signal modulator 64. Namely, pumping light for leading the Raman amplification within the wavelength band of the signal light on the optical fiber line 16 is applied to the optical fiber line 16 and the intensity of the pumping light is modulated with the output of the monitor signal modulator 64. As a result, the gain of the signal light propagating on the optical fiber line 16 fluctuates according to the output of the monitor signal modulator 64 and thus brings the same effect with the case in which the gain of the optical amplifier 42 is fluctuated.

Figure 2A:
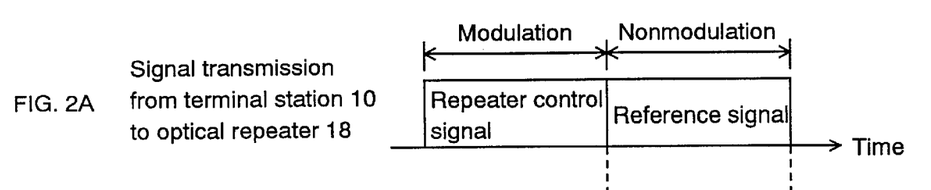
FIG. 2 is a timing chart of a control signal, a reference signal and a monitor signal according to the embodiment; (A) shows a transmission sequence of the control signal and reference signal and (B) shows a transmission timing of the monitor signal.
Figure 2B:
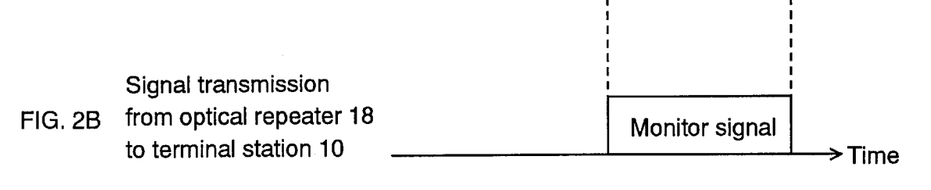

FIG. 2(A) shows transmission timing of the signal from the terminal station 10 to the optical repeater 18. FIG. 2(B) shows transmission timing of the monitor signal from the optical repeater 18 to the terminal station 10. The optical repeater 18 produces the carrier of the monitor signal and transmits the monitor signal to the terminal station 10 while receiving the reference signal from the terminal station 10.

Explained next is the process in which the terminal station 10 makes the optical repeater 18 transmit the monitor signal showing the operating state of the optical repeater 18 toward the terminal station 10.

As shown in FIG. 2(A), the terminal station 10 first transmits the repeater control signal toward the optical repeater 18. The repeater control signal, for instance, is such signals for remotely controlling the operating state of the optical repeater 18 and inquiring the operating state of the optical repeater 18. The control/process circuit 26 outputs a control signal with desired contents (in the embodiment, the signal is for inquiring the operating state of the optical repeater 18.) toward the control signal modulator 24. Also applied to the control signal modulator 24 is the reference signal obtained from dividing the output of the reference oscillator 20 by the frequency divider 22. The control signal modulator 24 modulates the reference signal with the control signal from the control/process circuit 26. The modulated signal is applied to the superimposer 30. The superimposer 30 superimposes the output of the control signal modulator 24 on the signal light generated by the laser light source 27 and the optical modulator 28 and outputs it toward the optical fiber 14a.

The light propagating on the optical fiber 14a enters the optical amplifier 40 in the optical repeater 18 and is optically amplified there. The light is then divided into two portions by the optical divider 46; one portion enters the following optical fiber 16b and the other enters the photodetector 50. The photodetector 50 converts the intensity of the incident light into an electrical signal and applies it to the BPF 54. The BPF 54 extracts the component of frequency which is equal to the output frequency of the frequency divider 22 from the output of the photodetector 50 and applies it to the reference reproducing circuit 56 and control signal demodulator 58. At this stage, the control signal demodulator 58 demodulates the output of the BPF 54 by a demodulation method corresponding to the modulation method of the control signal modulator 24 and applies the obtained control signal to the control circuit 62. The control circuit 62 controls each part according to the input control signal and collects the data showing the operating state of each part.

The terminal station 10 transmits the control signal toward the optical repeater 18 for a certain period and then stops supplying the control signal to the control signal modulator 24 for making the control signal modulator 24 in a nonmodulating operating state. By this operation, the output of the frequency divider 22 passes through the control signal modulator 24 without stopping and enters the superimposer 30. The superimposer 30, similarly to the case when the control signal is transmitted, superimposes the output of the control signal modulator 24 on the signal light generated by the laser light source 27 and the optical modulator 28 and outputs it toward the optical fiber 14a. Consequently, the reference signal, which defines the frequency of the carrier used when the optical repeater 18 transmits the monitor signal toward the terminal station 10 (or 12), is transmitted from the terminal station 10 to the optical repeater 18.

Similarly to the case of the control signal, in the optical repeater 18, the BPF 54 extracts the component of frequency equal to the output frequency of the frequency divider 22 from the output of the photodetector 50 and applies it to the reference reproducing circuit 56 and control signal demodulator 58. The reference reproducing circuit 56 multiplies the frequency of the output (the reference signal) of the BPF 54, and the frequency divider 60 divides the output frequency of the reference reproducing circuit 56. Owing to this operation, a carrier for transmitting the monitor signal toward the terminal station 10 (or 12) is obtained and applied to the monitor signal modulator 64. The control circuit 62 applies the monitor signal showing the previously collected repeater data to the monitor signal modulator 64. The monitor signal modulator 64 modulates the output of the frequency divider 60 with the monitor signal from the control circuit 62 by a digital modulating method such as ASK, FSK or PSK. The output of the monitor signal modulator 64 is applied to the pumping circuit 44. The pumping circuit 44, as explained above, weakly modulates the intensity of the pumping light to be transmitted toward the optical amplifier 40 and/or the optical amplifier 42 according to the output of the monitor signal modulator 64, superimposes the monitor-signal-modulated signal on the signal light propagating from the terminal station 12 to the terminal station 10 on the optical fiber line 16, and transmits it with the signal light toward the terminal station 10.

In the terminal station 10, the photodetector 32 converts the input light from the optical fiber line 16 into an electrical signal. The output of the photodetector 32 enters the receiver 34 and the monitor signal demodulator 36. The frequency divider 38 divides the output frequency of the reference oscillator 20 at a frequency dividing ratio (e.g. 1/148) so as to obtain a carrier frequency (e.g. 43.041 kHz) to be used when the optical repeater 18 transmits the monitor signal toward the terminal station 10 and applies it to the monitor signal demodulator 36. The monitor signal demodulator 36 demodulates the monitor signal from the output of the photodetector 32 using the output of the frequency divider 38. The demodulated monitor signal is applied to the control/process circuit 26. Accordingly, the terminal station 10 can check the detailed operating state of the remote optical repeater 18.

The relation of frequency dividing ratios among the frequency dividers 22, 60 and 38 is explained here. As to the carrier of the monitor signal, in a 10,000 km repeatered transmission system of a transpacific length, a 43 kHz band is most suitable in terms of modulating characteristics of optical amplifiers and frequency characteristics due to the multi-stage connection of the optical amplifiers. Considering the simpler process in the optical repeater 18, the frequency of the reference signal to be transmitted from the terminal station 10 to the optical repeater 18 is set to 455 kHz. The reference reproducing circuit 56 generates 3.185 MHz through multiplying the received reference signal by an odd number (concretely, seven), and the frequency divider 60 generates 43.04 kHz by dividing the output of the reverence reproducing circuit 56 by 74.

In the terminal station 10, when the oscillating frequency of the reference oscillator 20 is 3.185 MHz, the frequency dividing ratio of the frequency divider 22 becomes 1/7 and the duty factor becomes out of 50%. Since the duty factor is preferably 50%, a denominator n of the frequency-dividing factor 1/n of the frequency divider 22 need to be integer. Therefore, the oscillating frequency of the reference oscillator 20 is set to 6.37 MHz which is fourteen times (=2×7) of 455 kHz. The oscillating frequency of the reference oscillator 20 also can be 9.555 MHz which is twenty-one times (=3×7) of 455 kHz.

In order to equalize the carrier frequency from the frequency divider 60 in the optical repeater 18 with the output frequency of the frequency divider 38, the frequency dividing factor of the frequency divider 38 should be 1/148. However, when the oscillating frequency of the reference oscillator 20 is 9.555 MHz, the frequency dividing factor of the frequency divider 38 should be 1/222. By equalizing the output frequency of the frequency divider 38 with the frequency of the carrier of the monitor signal, synchronous detection at the monitor signal demodulator 36 becomes possible and thus the demodulation of the monitor signal becomes much easier.

Figure 3:
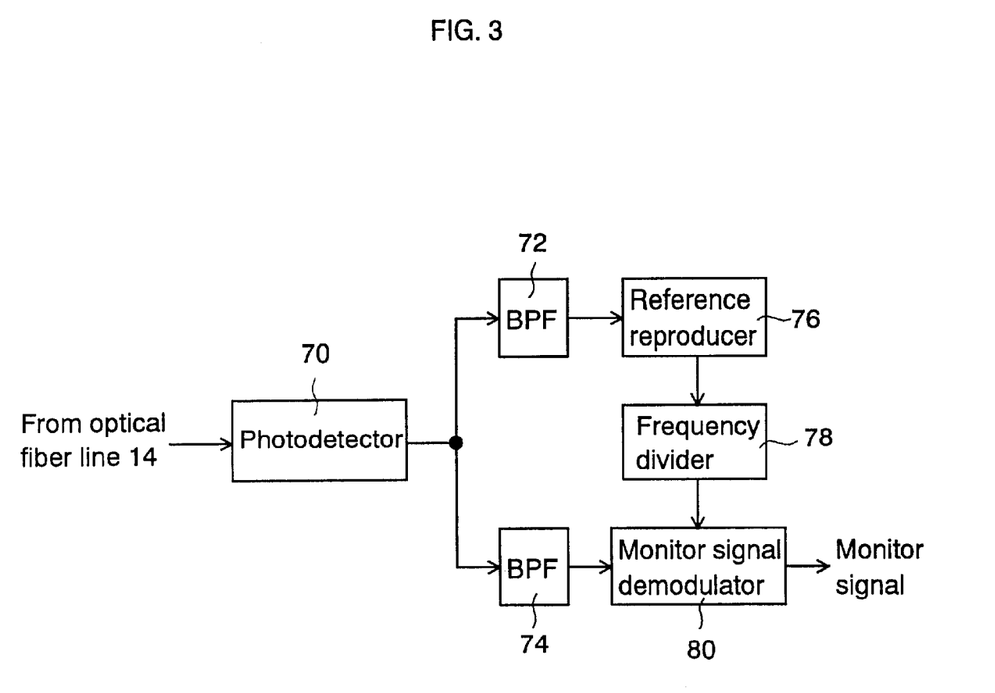
FIG. 3 is a schematic block diagram of a monitor signal receiving system at a terminal station 12.

It is also possible to receive the monitor signal at the terminal station 12. FIG. 3 shows an embodiment for demodulating the monitor signal at the terminal station 12. In this case, the pumping circuit 44 in the optical repeater 18 modulates the intensity of the pumping light to be transmitted toward the optical amplifier 40 according to the output of the monitor signal modulator 64.

The photodetector 70 converts the input light from the optical fiber 14b into an electrical signal. The output of the photodetector 70 is applied to the BPFs 72 and 74. The BPF 72 extracts the reference signal component to be transmitted from the terminal station 10 to the optical fiber line 14. The BPF 74 extracts the frequency component of the monitor-signal-modulated signal to be transmitted from the optical repeater 18 to the optical fiber line 14 using the gain modulation of the optical amplifier 40. The output of the BPF 72 is applied to the reference reproducing circuit 76. The reference reproducing circuit 76, which has similar structure to the reference reproducing circuit 56 in the optical repeater 18, multiplies the output frequency of the BPF 72 using PLL and the frequency divider 78 generates the frequency signal for synchronously detecting the monitor-signal-modulated signal by dividing the output frequency of the reference reproducing circuit 76. The reference reproducing circuit 76 and frequency divider 78 are respectively equal to the reference reproducing circuit 56 and frequency divider 60 in the optical repeater 18 and similarly function. That is, the output frequency of the frequency divider 78 is equal to that of the frequency divider 60. The monitor signal demodulator 80 synchronously detects the monitor signal by multiplying the output of the frequency divider 78 with the output of the BPF 74.

In the embodiment, since the carrier frequency (455 kHz) of the reference signal to be transmitted from the terminal station 10 to the optical fiber line 14 and the carrier frequency (43.041 kHz) used for transmitting the monitor signal from the optical repeater 18 to the terminal station 12 are different, the terminal station 12 can easily distinguish the reference signal from the monitor signal carrier.

Figure 4:
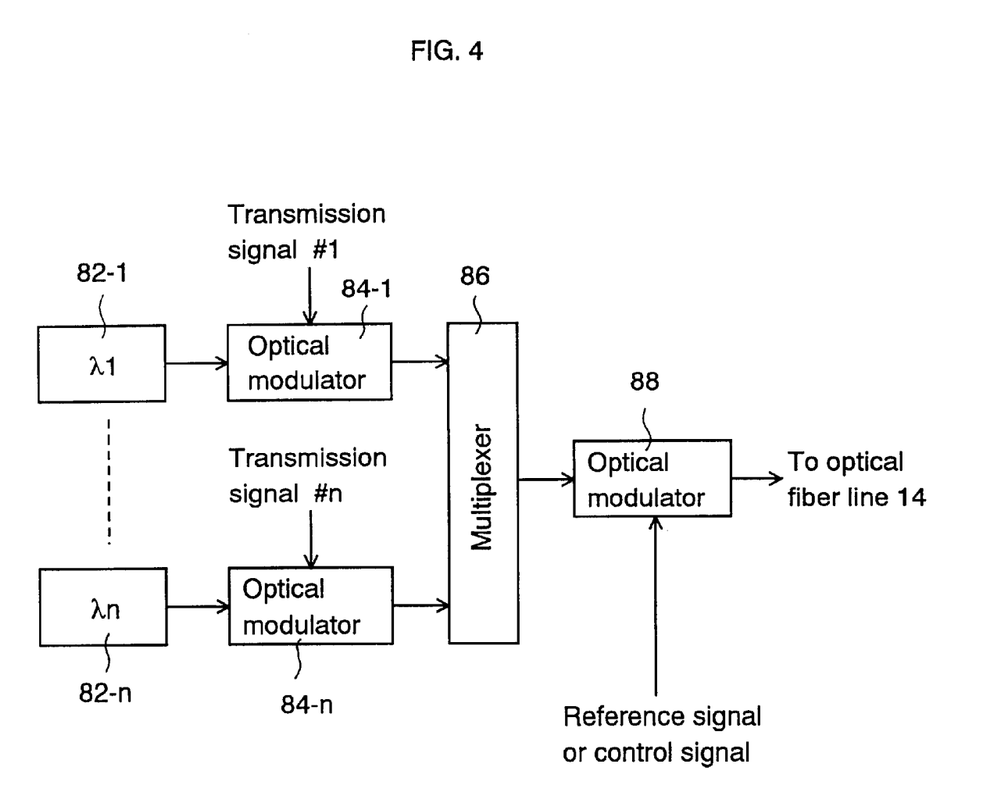
FIG. 4 is a schematic block diagram of an embodiment of a superimposer 30.
Figure 5:
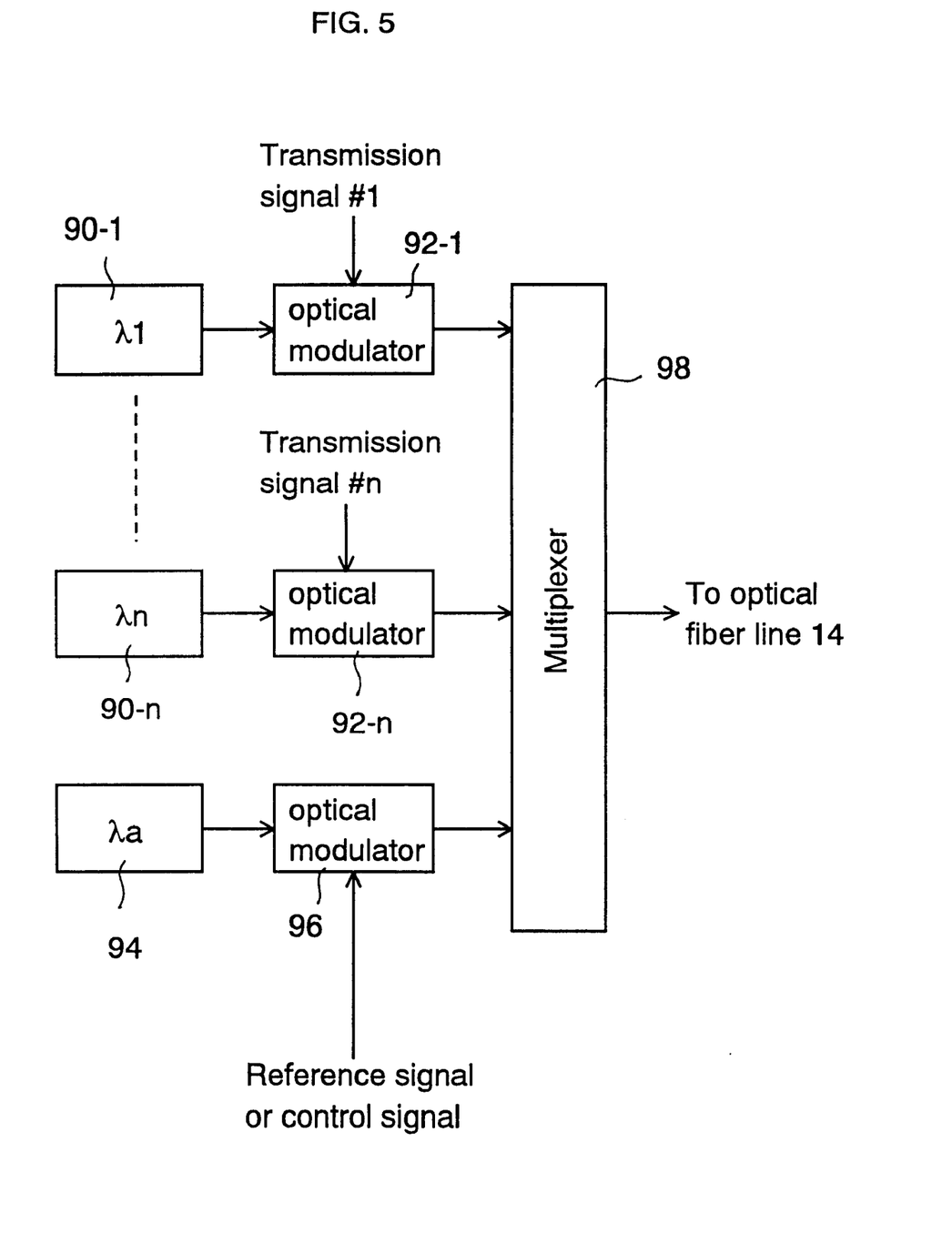
FIG. 5 is a schematic block diagram of another embodiment of the superimposer 30.

The superimposing method of the signal light and reference signal (or the control signal modulated signal) in the superimposer 30 is explained below. FIG. 4 shows an example of configuration in which the amplitude of the transmission signal light is modulated with the reference signal (or the control signal modulated signal) and transmitted. FIG. 5 shows an example of configuration to provide a dedicated wavelength for transmitting the reference signal (or the control signal modulated signal).

FIG. 4 is explained below. Laser light sources 82-1~82-n are laser-oscillated at respectively different wavelengths $\lambda 1$~$\lambda n$, and optical modulators 84-1~84-n modulate the intensities of output light from the respective laser light sources 82-1~82-n with transmission signals #1~#n. A multiplexer 86 multiplexes the output lights from the optical modulators 84-1~84-n. An optical modulator 88 weakly modulates the intensity of the output from the multiplexer 86 with the output (namely, the reference signal or the control signal modulated signal) from the control signal modulator 24. The output of the optical modulator 88 is output toward the optical fiber line 14. In this example, the optical modulator 88 acts a role of the superimposer 30. The configuration of the optical repeater 18 in the embodiment shown in FIG. 1 corresponds to the superimposing method shown in FIG. 5.

FIG. 5 is explained below. Laser light sources 90-1~90-n laser-oscillate at respectively different wavelengths $\lambda 1$~$\lambda n$, and optical modulators 92-1~92-n modulate the intensities of output light from the respective laser light sources 90-1~90-n with transmission signals #1~#n. A laser light source 94 is laser-oscillated at a wavelength $\lambda a$ different from the wavelengths $\lambda 1$~$\lambda n$ of the signal light, and an optical modulator 96 modulates the intensity of output light from the laser light source 94 with the output (namely, reference signal or control signal modulated signal) from the control signal modulator 24. A multiplexer 98 multiplexes the output lights from the optical modulators 92-1~92-n and the optical modulator 96 and outputs toward the optical fiber line 14. In this configuration, the laser light source 94, the optical modulator 96 and the multiplexer 98 compose the superimposer 30. In the optical repeater 18, an optical filter for removing the wavelength $\lambda a$ should be disposed at the optical stage.

As readily understandable from the aforementioned description, according to the invention, since a carrier, which carries a monitor signal showing a operating state of an optical repeater toward a terminal station, can be generated inside the optical repeater based on a reference signal from the same terminal station or another terminal station, it is no need to dispose a local oscillator in the optical repeater. As a result, it is no longer necessary for a monitor signal receiving side to consider a frequency fluctuation of a carrier for carrying a monitor signal and thus it is unnecessary for a receiver to have an inefficiently wide bandwidth for receiving the monitor signal. As the synchronous detection can be used for demodulating a monitor-signal-modulated signal at a terminal station, a monitor signal can be demodulated at a high signal-to-noise ratio.

While the invention has been described with reference to the specific embodiment, it will be apparent to those skilled in the art that various changes and modifications can be made to the specific embodiment without departing from the spirit and scope of the invention as defined in the claims.

What is claimed is:

1. An optical repeater monitoring system, comprising: an oscillating source;
a reference signal transmitter for transmitting a reference signal with a predetermined frequency generated from an output of the oscillating source to a first optical fiber;
an optical repeater having a first photodetector for converting light from the first optical fiber into an electrical signal, a reference signal extractor for extracting a component of the reference signal from an output of the first photodetector, a carrier generator for generating a carrier from an output of the reference signal extractor, a monitor signal modulator for modulating the carrier generated by the carrier generator with a monitor signal showing an operating state of the optical repeater, and a transmitter for transmitting an output of the monitor signal modulator to a second optical fiber;
a demodulating signal generator for generating a demodulating signal from either of the output from the oscillating source and the reference signal, the demodulating signal having a frequency equal to that of the carrier of the monitor signal;
a second photodetector for photodetecting the light propagated on the second optical fiber; and
a monitor signal demodulator for demodulating the monitor signal from outputs of the second photodetector and demodulating signal generator.

2. The optical repeater monitoring system of claim 1 wherein the oscillating source, the reference signal transmitter, the demodulating signal generator and the monitor signal demodulator are disposed in the same terminal station and the demodulating signal generator generates the demodulating signal from the output of the oscillating source.

3. The optical repeater monitoring system of claim 1 wherein the oscillating source and reference signal transmitter are disposed in a first terminal station while the demodulating signal generator and monitor signal demodulator are disposed in a second terminal station;
the optical repeater transmits the light from the first optical fiber to the second optical fiber; and
the demodulating signal generator generates the demodulating signal from the reference signal propagated on the first and second optical fibers.

4. The optical repeater monitoring system of claim 1 wherein the reference signal transmitter comprises a superimposer for superimposing the reference signal on a transmission signal light.

5. The optical repeater monitoring system of claim 4 wherein the superimposer comprises an optical multiplexer for multiplexing light, which carries the monitor signal and has a wavelength different from that of the transmission signal light, and the transmission signal light.

6. The optical repeater monitoring system of claim 4 wherein the superimposer comprises an optical modulator for modulating intensity of the transmission signal light according to the reference signal.

7. The optical repeater monitoring system of claim 1 wherein the reference signal comprises a tone signal having a single frequency.

8. The optical repeater monitoring system of claim 1 wherein the monitor signal modulator comprises a modulator with one of the modulating systems of amplitude-shift keying, phase-shift keying and frequency-shift keying.

9. The optical repeater monitoring system of claim 1 wherein the transmitter comprises an optical modulator for modulating intensity of the signal light output onto the second optical fiber according to the output of the monitor signal modulator.

10. The optical repeater monitoring system of claim 9 wherein the optical modulator comprises a means for varying a gain of the signal output onto the second optical fiber according to the output of the monitor signal modulator.

11. An optical repeater monitoring method, comprising:
a reference signal transmitting step for transmitting a reference signal of a predetermined frequency from a reference signal transmitter to an optical repeater through an optical fiber line;
a carrier generating step in the optical repeater for generating a carrier, which carries a monitor signal of the optical repeater and has a frequency different from that of the reference signal, out of the reference signal;
a monitor signal modulating step in the optical repeater for modulating the carrier with the monitor signal;
a monitor signal transmitting step in the optical repeater for transmitting the modulated wave of the monitor signal obtained by the monitor signal modulating step is transmitted toward a monitor signal receiver;
a demodulating signal generating step in the monitor signal receiver for generating a demodulating signal having a frequency equal to that of the carrier; and
a monitor signal demodulating step in the monitor signal receiver for demodulating the monitor-signal-modulated signal transferred from the optical repeater with the demodulating signal.

12. The optical repeater monitoring method of claim 11 wherein the demodulating signal generating step generates the demodulating signal from one of the reference signal and output from a signal source from which the reference signal is generated.

13. The optical repeater monitoring method of claim 11 the reference signal transmitting step comprises a superimposing step for superimposing the reference signal on the transmission signal light.

14. The optical repeater monitoring method of claim 13 wherein the superimposing step comprises an optical multiplexing step for multiplexing the light for carrying the monitor signal and having a wavelength different from that of the transmission signal light with the transmission signal light.

15. The optical repeater monitoring method of claim 13 wherein the superimposing step comprises an optical modulating step for modulating intensity of the transmission signal light according to the reference signal.

16. The optical repeater monitoring method of claim 11 wherein the monitor signal modulating step comprises one of the modulating steps of amplitude-shift keying, phase-shift keying and frequency-sift keying.

17. The optical repeater monitoring method of claim 11 wherein the monitor signal transmitting step comprise an optical modulating step for modulating intensity of the transmission signal light according to the output of the monitor signal modulating step.

18. An optical repeater monitoring system, comprising:
an oscillating source;
a reference signal transmitter to transmit a reference signal with a predetermined frequency generated from an output of the oscillating source to a first optical fiber;
an optical repeater having a first photodetector to convert the reference signal from the first optical fiber into an electrical signal, a reference signal extractor to extract a component of the converted reference signal from an output of the first photodetector, a carrier generator to generate a carrier from an output of the reference signal extractor, a monitor signal modulator to modulate the carrier generated by the carrier generator with a monitor signal showing an operating state of the optical repeater, and a transmitter to transmit an output of the monitor signal modulator to a second optical fiber;

a demodulating signal generator to generate a demodulating signal from the output from the oscillating source, the demodulating signal having a frequency equal to that of the carrier of the monitor signal;

a second photodetector to photodetect the light on the second optical fiber; and a monitor signal demodulator to demodulate the monitor signal from outputs of the second photodetector and demodulating signal generator.

19. The optical repeater monitoring system of claim 18 further comprising a terminal station including the oscillating source, the reference signal transmitter, the demodulating signal generator and the monitor signal demodulator.

20. The optical repeater monitoring system of claim 18 further comprising a first terminal station including the oscillating source and the reference signal transmitter, and a second terminal station including the demodulating signal generator and the monitor signal demodulator;

wherein the optical repeater transmits the light from the first optical fiber to the second optical fiber; and wherein the demodulating signal generator generates the demodulating signal from the reference signal on the second optical fiber.

21. The optical repeater monitoring system of claim 18 wherein the reference signal transmitter comprises a superimposer to superimpose the reference signal on transmission signal light.

22. The optical repeater monitoring system of claim 21 wherein the superimposer comprises an optical multiplexer to multiplex the transmission signal light with light which carries the reference signal having a wavelength different from that of the transmission signal light.

23. The optical repeater monitoring system of claim 21 wherein the superimposer comprises an optical modulator to modulate intensity of the transmission signal light according to the reference signal.

24. The optical repeater monitoring system of claim 18 wherein the reference signal comprises a tone signal having a single frequency.

25. The optical repeater monitoring system of claim 18 wherein the monitor signal modulator comprises a modulator with a modulation comprising amplitude-shift keying, phase-shift keying or frequency-shift keying.

26. The optical repeater monitoring system of claim 18 wherein the transmitter comprises an optical modulator to modulate intensity of signal light output onto the second optical fiber according to the output of the monitor signal modulator.

27. The optical repeater monitoring system of claim 26 wherein the optical modulator comprises means for varying a gain of the signal light output onto the second optical fiber according to the output of the monitor signal modulator.

28. An optical repeater monitoring method, comprising:

transmitting a reference signal of a predetermined frequency from a reference signal transmitter to an optical repeater through an optical fiber line;

generating a carrier, in the optical repeater, the carrier having a frequency different from that of the reference signal;

modulating the carrier with an optical repeater monitor signal in the optical repeater;

transmitting the modulated carrier from the optical repeater toward a monitor signal receiver;

generating a demodulating signal having a frequency equal to that of the carrier in the monitor signal receiver; and demodulating the modulated carrier with the demodulating signal in the monitor signal receiver.

29. The optical repeater monitoring method of claim 28 wherein the demodulating signal generation comprises generating the demodulating signal from a signal source from which the reference signal is generated.

30. The optical repeater monitoring method of claim 28 wherein the reference signal transmission comprises superimposing the reference signal on transmission signal light.

31. The optical repeater monitoring method of claim 30 wherein the superimposition comprises multiplexing the transmission signal light with light for carrying the reference signal having a wavelength different from that of the transmission signal light.

32. The optical repeater monitoring method of claim 30 wherein the superimposition comprises modulating intensity of the transmission signal light according to the reference signal.

33. The optical repeater monitoring method of claim 28 wherein the monitor signal modulation comprises modulating the carrier with amplitude-shift keying, phase-shift key or frequency-shift keying.

34. The optical repeater monitoring method of claim 28 wherein the monitor signal transmission comprises modulating intensity of transmission signal light in accordance with the modulated carrier.

* * * * *